June 25, 1963
J. J. BLACK
3,095,215
SPLASH GUARD
Filed Nov. 13, 1961
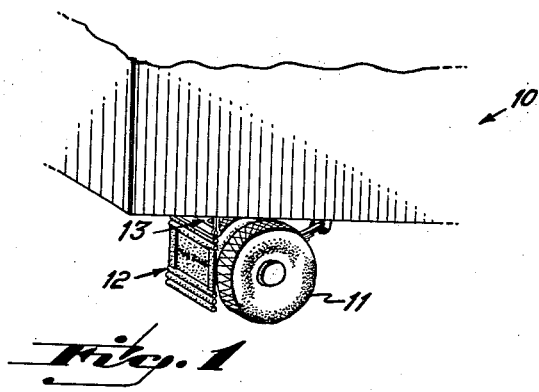
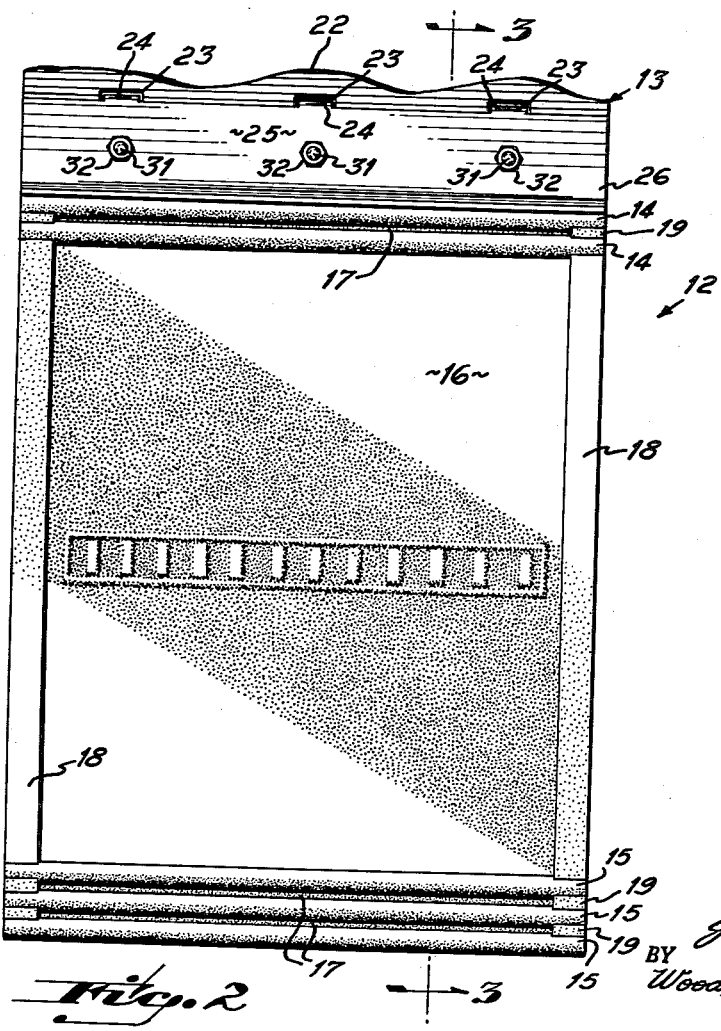
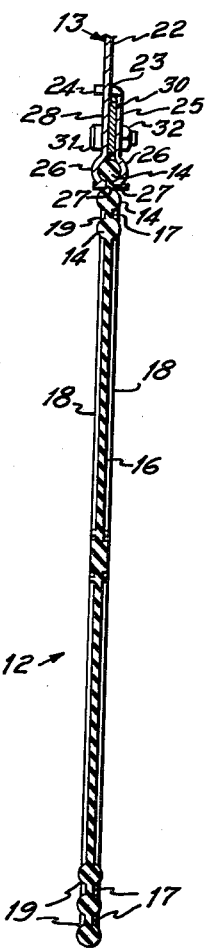
INVENTOR.
James J. Black
BY Wood, Herron & Evans
ATTORNEYS

United States Patent Office 3,095,215
Patented June 25, 1963

3,095,215
SPLASH GUARD
James J. Black, Cincinnati, Ohio, assignor, by mesne assignments, to Pullman Incorporated, a corporation of Delaware
Filed Nov. 13, 1961, Ser. No. 151,958
4 Claims. (Cl. 280—154.5)

This invention relates to a reusable splash guard.

The majority of splash guards presently in use are of reclaimed rubber or other flexible material and are molded in a flat generally rectangular sheet. The sheet normally has a flat rib around the perimeter on either side thereof, and is secured to a truck or other motor vehicle immediately behind the rear wheels of the vehicle by attaching the upper edge of the splash guard to supporting structure on the vehicle. When the vehicle is backed into an abutment such as a high curb, stop or loading dock, the splash guard tends to become clamped between the rear wheel and the abutment. Continued backing of the vehicle for only the shortest distance many times rips the splash guard. The tear might occur at the positions at which the splash guard is secured to the vehicle or it might occur along an indeterminate line of weakened material or application of the greatest stress.

In any event, the tearing of the splash guard under the conditions outlined above normally results in its destruction.

It has been an objective of the invention to provide a splash guard which, when subjected to the conditions of usage described above, will not have its usefulness completely destroyed. To the contrary, the invention contemplates a splash guard having a preselected tear line. For all normal conditions of usage, the splash guard, even along its preselected tear line, will have sufficient strength to withstand the stresses encountered. However, under the abnormal conditions of stress which the material of the splash guard is unable to withstand, tearing will occur along a preselected line so as to avoid the complete destruction of the splash guard.

The invention further contemplates the combination of a splash guard and mounting clamp therefor. In accordance with the invention, the splash guard has one or a plurality of spaced parallel potential or latent tear lines adjacent one edge of the splash guard, only one of the latent tear lines becoming an actual tear line by the application of the mounting clamp to that tear line. Thus, it is possible through the invention to mount the splash guard in such a manner as to preselect the tear line closest to the edge of the splash guard and, upon tearing along the preselected line the mounting clamp can be applied to the next adjacent tear line. Through the use of the plurality of potential adjacent tear lines, a single splash guard can be reused as many times as there are tear lines with a diminution of the length of the splash guard after each tearing confined to a matter of about 5%.

It has been another objective of the invention to provide a splash guard of generally rectangular configuration having a plurality of beads molded integrally with the splash guard and lying in adjacent parallel relation at at least the upper edge portion of the splash guard. Additionally, the splash guard has a pair of ribs along the side edge of the splash guard which are of intermediate thickness between the thickness of the parallel beads and the thickness of the body of the splash guard. A mounting clamp for the splash guard has two longitudinal edges forming jaws which engage the splash guard between two of the parallel ribs, and crush that portion of the side ribs which passes between adjacent beads. The parallel beads form potential tear lines and the crushing of the side ribs transforms the potential tear lines into actual tear lines when the splash guard is mounted on the vehicle. In other words, the crushing action of the mounting clamp when applied provides two points of minimum resistance to tear, these points being the terminals of the preselected potential tear line.

The several features of the invention will become more readily apparent from the following detailed description taken in conjunction with the accompanying drawings in which:

FIG. 1 is a fragmentary perspective view of a vehicle having a splash guard according to the present invention applied thereto;

FIG. 2 is a front elevational view of a splash guard according to the present invention; and FIG. 3 is a cross sectional view taken along lines 3—3 of FIG. 2.

As shown in the drawings, a vehicle 10 such as a truck or semi-trailer having rear wheels 11 has a splash guard 12 mounted immediately adjacent the rear wheels 11. The splash guard is secured to the vehicle by means of a mounting clamp 13 to be described in greater detail below. Referring to FIG. 2, the splash guard, which may be formed of rubber or other similar flexible material, is provided with a series of spaced parallel beads 14 at the upper end thereof and similar spaced parallel beads 15 at the lower end thereof. As best illustrated in FIG. 3, the beads 14 and 15 are of considerably greater thickness than the thickness of the web 16 forming the body of the splash guard. The space between each of the beads, indicated at 17, forms a potential or latent tear line.

Flat ribs 18 are molded integrally along the side edges of the splash guard on the inside and outside thereof. The ribs 18 extend the full length of the splash guard and intersect the beads 14 and 15 as indicated at 19.

As seen from FIG. 3, the ribs 18 are of smaller thickness than the beads 14 and 15 but are of greater thickness than the central body forming web 16.

The mounting clamp 13 comprises a plate 22 secured at its upper edge in some suitable manner to the vehicle. The lower portion of the plate 22 is slotted as at 23 to provide hinge receptacles to receive male hinge members 24 projecting from a movable clamping jaw 25. The lower ends of the plate 22 and the movable clamping jaw are cylindrically embossed as at 26 to receive the generally cylindrical beads 14 or 15 and are terminated in edges 27. The jaw 25 is maintained spaced from a corresponding fixed jaw portion 28 of the plate 22 by a stop 30. The stop 30 may be a strip of metal of sufficient thickness to maintain the proper jaw spacing. The jaws of the mounting clamp are secured together by three bolts 31, onto which are threaded nuts 32.

When the nuts and bolts are fully applied to close the movable jaw 25 with respect to the fixed jaw portion 28, the stop 30 maintains the jaw edges 27 spaced apart by a distance equal to the thickness of the body forming web 16.

In the operation of the invention the uppermost bead is applied between the cylindrical portions 26 of the mounting clamp jaws and the nuts 32 are turned down onto the bolts 31. The tightening of the nuts forces the jaw edges 27 toward each other until they are spaced apart a distance approximately equal to the thickness of the body forming web 16. As they are fixed together the jaw edges 27 crush between them the underlying rib portions 19 located between adjacent beads. The crushing action stresses the ribs to such an extent that where they are crushed they form locations of weakest resistance to tear and thus convert the potential tear line between beads to an actual tear line.

When the vehicle is backed into an obstacle and vertical stress applied to the splash guard, a tear will begin at the clamped portions of the ribs 18 and will continue along the tear line formed between the two beads until the uppermost bead is ripped away from the splash guard. Tearing should not begin at any other place around the periphery of the splash guard because every point around the periphery of the splash guard is reinforced by an unstressed vertical rib 18 or horizontal bead 14 or 15.

If the splash guard is torn away from its uppermost bead, as described above, it can immediately be replaced by loosening the nuts 32, removing the torn bead and replacing the splash guard by securing the clamping mount about the next upper bead. When the upper beads 14 are exhausted, the splash guard may simply be inverted and secured to the clamping mount by means of the lower beads 15.

Thus, where a splash guard would normally have its usefulness completely destroyed by one incident of the type referred to above, the splash guard of the present invention can be reused several times because of the preselection of the tear line. It should be well understood that the particular shape of the beads and ribs shown in the accompanying drawings is not necessary to successful operation of the invention. For example, the rounded beads 14 and 15 could equally as well be of rectangular cross section and the generally rectangular ribs 18 could be of cylindrical cross section.

I claim:

1. A splash guard comprising a sheet of flexible material having top, bottom and side edges, at least two adjacent parallel beads along said top edge and integral with said sheet, a rib along each of the side edges of said sheet and interconnecting the ends of said parallel beads, a clamp terminating in elongated jaw edges disposed between said parallel beads and engaging said side edge ribs, and pressure applying means to close said jaw edges thereby crushing that portion of each said side edge rib between said parallel beads.

2. A splash guard comprising a sheet of flexible material forming a web having top, bottom and side edges, at least two adjacent parallel beads along said top edge and integral with said sheet, a rib along each of the side edges of said sheet and interconnecting the ends of said parallel beads, a clamp having a pair of jaws terminating in elongated jaw edges disposed between said parallel beads and engaging said side edge ribs, a stop disposed between said jaws to limit the spacing between said jaw edges upon complete closure to the thickness of said web, and pressure applying means to close said jaw edges thereby crushing that portion of each said side edge rib between said parallel beads.

3. A splash guard comprising a sheet of flexible material having top, bottom and side edges, at least two adjacent parallel beads along said top edge and integral with said sheet, a rib along each of the side edges of said sheet and interconnecting the ends of said parallel beads, and means for securing said splash guard to a vehicle including means for gripping and compressing said ribs at a location between adjacent beads.

4. A splash guard comprising a sheet of flexible material having top, bottom and side edges, a plurality of adjacent parallel beads along said top edge and integral with said sheet, the lines between adjacent beads forming potential tear lines, a rib along each of the side edges of said sheet and interconnecting the ends of said parallel beads, a clamp terminating in elongated jaw edges disposed between said parallel beads and engaging said side edge ribs, and pressure applying means to close said jaw edges thereby crushing that portion of each said side edge rib between said parallel beads, and converting its associated potential tear line to an actual tear line.

References Cited in the file of this patent

UNITED STATES PATENTS

| | | |
|---|---|---|
| 333,408 | Hale | Dec. 29, 1885 |
| 2,464,746 | Gering | Mar. 15, 1949 |
| 2,593,179 | Price | Apr. 15, 1952 |